June 11, 1963 R. L. GAMAUNT 3,093,006
DRIVE AND GUIDE SPROCKET FOR TRACK LAYING VEHICLE
Original Filed Aug. 25, 1958
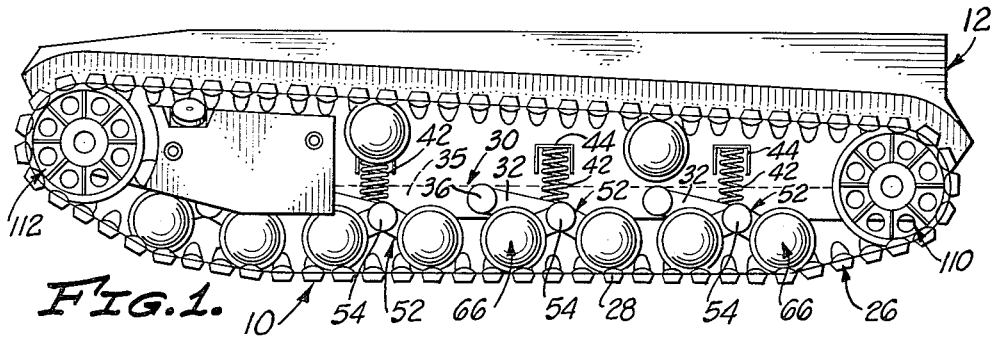
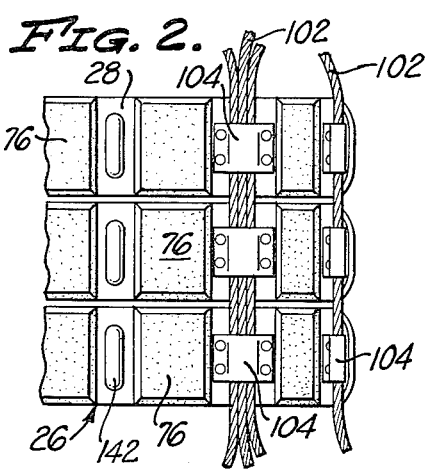
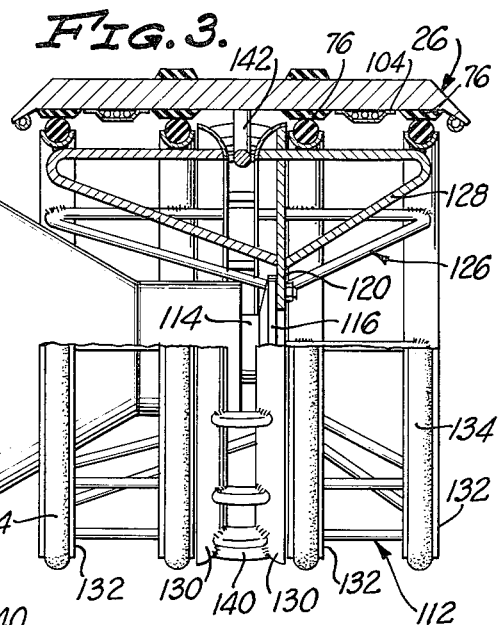
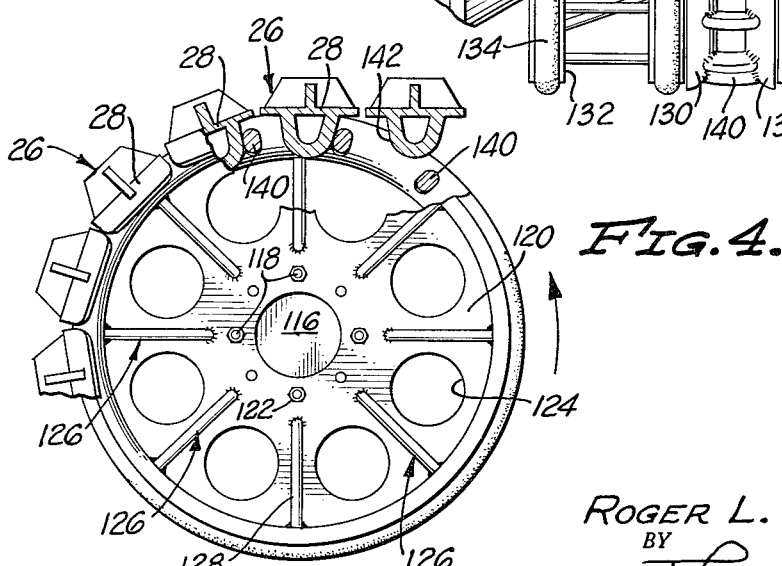
INVENTOR.
ROGER L. GAMAUNT
BY Thomas P. Mahoney
ATTORNEY 3,093,006
DRIVE AND GUIDE SPROCKET FOR TRACK
LAYING VEHICLE
Roger L. Gamaunt, P.O. Box 55, Fawnskin, Calif.
Original application Aug. 25, 1958, Ser. No. 757,074, now Patent No. 3,017,942, dated Jan. 23, 1962. Divided and this application Apr. 28, 1961, Ser. No. 106,255
3 Claims. (Cl. 74—243)

This invention relates to a track laying vehicle and, more particularly, to a track laying vehicle incorporating as part of the track laying mechanism thereof unique sprockets adapted to drive and guide the tracks of the vehicle under adverse conditions, such as snow and muddy terrain.

This application is a division of my co-pending application, Serial No. 757,074, filed August 25, 1958, now Patent No. 3,017,942, entitled "Track Laying Vehicle."

One of the greatest problem encountered in conventional track laying vehicles is the fact that the drive sprockets thereof, being of conventional construction, frequently become clogged with mud, dirt and/or snow. When so clogged there is a tendency for the sprockets to throw the track of the track laying vehicle and the vehicle is, thus, rendered inoperative.

It is, therefore, an object of my invention to provide a track laying system for a track laying vehicle and, more particularly, drive and alignment sprocket means therefor which is adapted to be self-clearing and which is not susceptible to become clogged with dirt, mud or snow.

Another object of my invention is the provision of a sprocket construction for a track laying vehicle which consists of a plurality of concentrically mounted rings the open nature of which prevents the accumulation or compaction of ice, mud, snow, and/or other material in the sprocket and, thus, eliminates the possibility of immobilization of the vehicle because of the accumulation of such materials therein.

Other objects and advantages of my invention will be apparent from the following specification and the accompanying drawing which is for the purpose of illustration only and in which:

FIG. 1 is a side elevational view of a track laying combat vehicle constructed in accordance with the teachings of my invention and including, particularly, sprockets constructed in accordance with the teachings thereof;

FIG. 2 is an enlarged, fragmentary, plan view of a portion of one of the tracks of the vehicle;

FIG. 3 is an enlarged, fragmentary, sectional view of the sprocket of the invention; and FIG. 4 is an enlarged, fragmentary, sectional view of the sprocket of my invention.

Referring to the drawing and particularly to FIGS. 1–3 thereof, I show a track laying combat vehicle 10 constructed in accordance with the teachings of my invention. While the teachings of my invention are illustrated as incorporated in a combat vehicle, it is, of course, to be understood that the principles thereof may be applied with equal cogency to various types of track laying vehicles and it is not intended that the principles of the invention be limited in their application to the specific type of vehicle described herein and shown in the accompanying drawings.

The vehicle 10 includes an elongated body 12 which is formed, by welding or other conventional expedients, from sheet steel.

The vehicle 10 is supported upon and moved by a pair of tracks 26 constituted by a plurality of interconnected cleats 28 whose construction will be described in greater detail below. The tracks 26 are supported on track suspension and alignment systems on each side of the body 12 of the vehicle 10 and each suspension system, indicated generally at 30, includes a plurality of trailing suspension arms 32 which are mounted at their forward extremities upon laterally extending studs, not shown, whose inner extremities are supported on longitudinal frame members 35 within the body 12 of the vehicle 10, as best shown in FIG. 4 of the drawing.

The forward extremities of the trailing suspension arms 32 include mounting bosses 36 which are pivotally secured to studs, not shown, fastened to the longitudinal frame members 35. The rearward extremity of each of the trailing suspension arms 32 is biased downwardly toward the lower run of the associated track 26 by a compression spring 42 whose upper extremity is received in a seat 44 mounted on the side of the body 12 of the vehicle 10.

While I have disclosed the compression or shock absorbing means of the suspension system 30 as including a spring 42, other types of shock absorbing means such as hydraulic cylinders and the like may be substituted therefor without materially altering the manner in which the suspension system 30 of my invention operates.

It will be noted, however, that the spring forces exerted by the springs 42 upon the trailing arms 32 are, as best shown in FIG. 1 of the drawing, applied in a straight, vertical line to the rearward extremity of each of the trailing arms 32. Therefore, as the suspension arm 32 is moved up and down when the track 26 encounters various obstacles in its path, the compression of the spring 42 does not cause lateral displacement of the suspension arm 32 and thus maintains the portion of the track 26 being deflected upwardly or downwardly in corresponding alignment with the remainder of the track.

Each of the trailing suspension arms 32 includes, as best shown in FIG. 1 of the drawing, a bogie supporting arm 52 mounted thereupon intermediate its forward and rearward extremities. Each bogie supporting arm 52 includes a centrally located mounting portion 54. The forward and rearward extremities of the bogie mounting arms 52 mount bogie wheel assemblies 66.

The tracks 26 of the vehicle 10 each include a plurality of cleats 28, each of the cleats being provided with a plurality of rubber pads 76. The cleats 28 are maintained in pivotal relationship with each other by lengths of steel cable 102 fastened in clips 104 secured to the cleats 28 and thus providing a continuous track 26 for the support and propulsion of the vehicle 10 and engagement by the bogie wheel assemblies 66.

Mounted in operative relationship with the vehicle 10 and constituting a part of the track suspension system 30 are guide sprockets 110 and driving sprockets 112 which are of identical configuration with the exception that the driving sprockets 112 are operatively secured upon a drive shaft 114, as best shown in FIG. 3 of the drawing. Since the guide and driving sprockets 110 and 112, respectively, are of identical configuration, only the driving sprockets 112 will be described herein.

The outermost extremity of the drive shaft 114 is, as best shown in FIG. 3 of the drawing, provided with an enlarged mounting portion 116 and incorporates a plurality of threaded studs 118 for the reception of correspondingly sized and shaped openings in a hub or mounting plate 120. The hub plate 120 is maintained in operative engagement with the drive shaft 114 by means of nuts 122 and incorporates a plurality of enlarged transverse openings 124.

Welded to the opposite surfaces of the hub plate 120 is a plurality of cantilever supporting members 126 constituted by substantially V-shaped rods 128 whose diagonal, inwardly disposed extremities are welded to the associated surface of the hub plate 120. The cantilever supports 126 have a plurality of coaxially oriented rings 130 and 132 welded thereto, the rings 132 being of semi-circular cross section and supporting tires 134 adapted to engage corresponding rubber pads 76 on the track 26.

It will be noted that the cantilever supports 126 extend transversely through the completely open rings 132 and that the V-shaped configuration of the supports 126 as constituted by the V-shaped rods 128 provides a substantially open structure, for a purpose which will be described in greater detail below.

The rings 130 are disposed in contiguity to each other and constitute the innermost of the plurality of rings. Unlike the rings 132, they do not engage a corresponding surface on the track 26, but are supported by securement to the outer extremities of the upper legs of the cantilever support 126 in juxtaposition to each other. Welded or otherwise secured between the legs 130 are sprocket dogs or teeth 140 which, as best shown in FIGS. 3 and 4 of the drawing, are adapted to engage radially inwardly projecting lugs 142 provided upon the individual cleats 28 of the track 26 to drive the track 26 about the suspension system 30.

It will be noted that the construction of the sprocket wheel 112 is a remarkably open construction by virtue of the fact that the primary elements thereof are constituted by the rings 130 and 132 and that the cantilever supports 126 are also of open configuration or construction to provide transverse passages therebetween. Therefore, when the sprocket 112 is submerged in mud or snow or other substance which would tend to become impacted on ordinary track drive means, a continuous circulation and propelling effect is achieved by virtue of the fact that the cantilever supports 126 serve as agitators which serve to propel and distribute any material which may infiltrate into the sprocket 112. In this manner, the clogging of detritus, snow, mud, or other materials which normally tend to prevent operation of conventional track laying sprockets by becoming impacted therein and between the sprockets themselves and the tracks, is eliminated and thus the sprockets are able to propel the tracks 26 through material which, when encountered by vehicles incorporating conventional drive sprockets, cause the immobilization of the same.

In addition, the arcuate configuration of the innermost rings 130 causes said rings to act as retracking devices. This is attributable to the fact that, when the lugs 142 on the track 26 tend to become dislodged from the sprocket 112, the arcuate rings 130 serve to urge the lugs 142 back into operative relationship with the sprocket 112.

I, therefore, provide by my invention drive and support sprockets which are characterized by their resistance to impactions by mud and similar semi-fluid substances and which are also characterized by the fact that they tend to resist the compaction therein of such detritus such as rocks, tree limbs and the like. Thus, the possibility that compaction of the drive sprockets with such material may occur is eliminated and the consequent dislocation of the associated tracks from the sprockets obviated.

I claim:

1. In a sprocket for a track laying vehicle, the combination of: a plurality of transversely spaced apart, coaxially arranged, and open rings; hub means located centrally of said rings; and ring mounting means including support arms, each of which has a transverse portion extending through and attached to said rings, and radially and laterally extending diagonal portions integral with said transverse portion and secured to opposite sides of said hub means, said support arms being circumferentially spaced apart to provide transverse passages therebetween, said hub means including transverse openings in communication with said passages whereby mud and the like may pass transversely through the sprocket.

2. In a sprocket for a track laying vehicle, the combination of: a plurality of coaxially arranged, transversely spaced apart, and open rings adapted to support at their peripheries the track of a track laying vehicle; hub means located centrally of said rings; and a plurality of supports extending radially and laterally of said hub means and connected to said rings, said supports being elongated rod-like elements circumferentially spaced apart to provide transverse passages therebetween, said hub means including transverse openings in communication with said passages whereby mud and the like may pass transversely through the sprocket.

3. In a sprocket for a track laying vehicle, the combination of: a plurality of coaxially arranged, transversely spaced apart, and open rings adapted to support at their peripheries the track of a track laying vehicle; hub means located centrally of said rings; and a plurality of rod members for supporting said rings upon said hub means, each of said rod members having a transverse portion extending through and attached to said rings, and radially and laterally extending diagonal portions integral with said transverse portion and secured to opposite sides of said hub means, said rod members being circumferentially spaced apart to provide transverse passages therebetween, said hub means including transverse openings in communication with said passages whereby mud and the like may pass transversely through the sprocket.

References Cited in the file of this patent

UNITED STATES PATENTS

| | | |
|---|---|---|
| 1,853,308 | Humphreys et al. | Apr. 12, 1932 |
| 2,271,172 | Heaslet | Jan. 27, 1942 |
| 2,967,075 | Christie | Jan. 3, 1961 |